United States Patent Office
3,005,605
Patented Oct. 24, 1961

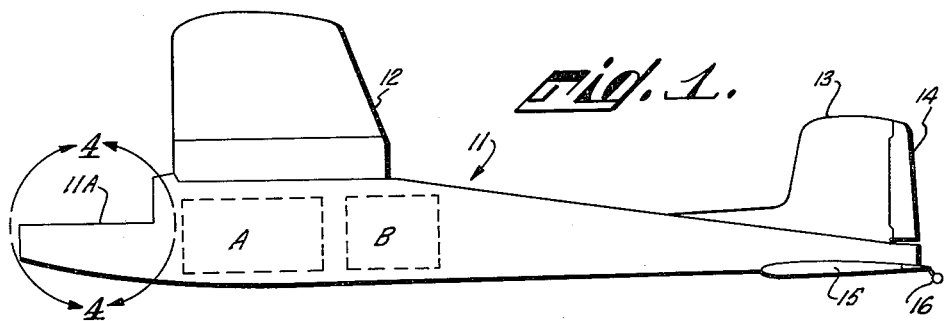
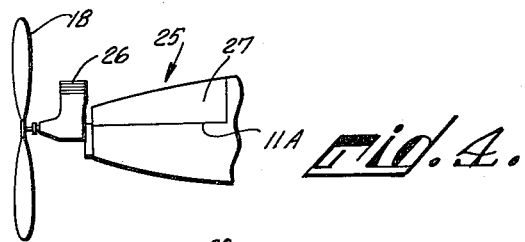
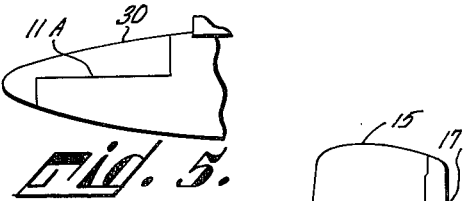
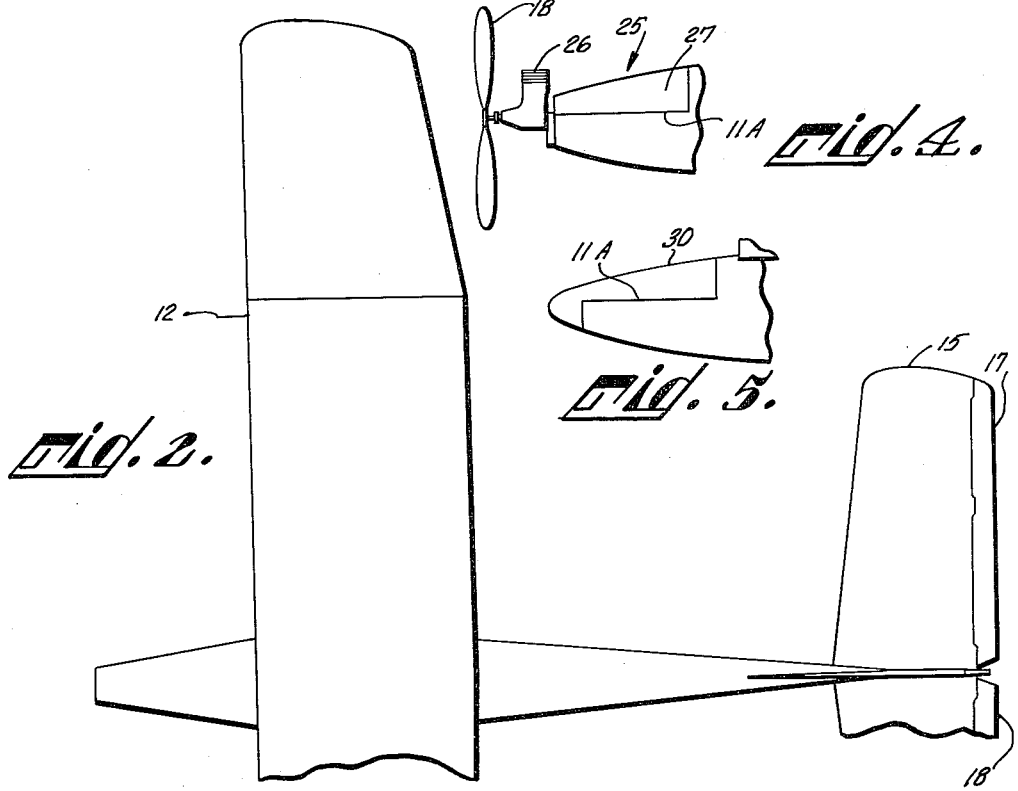
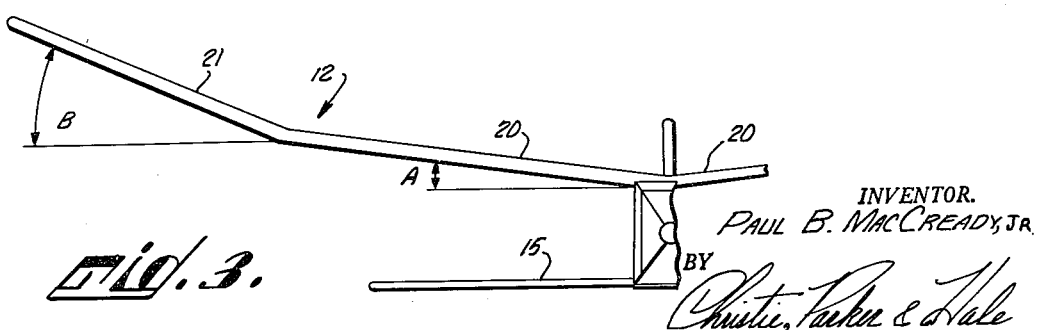

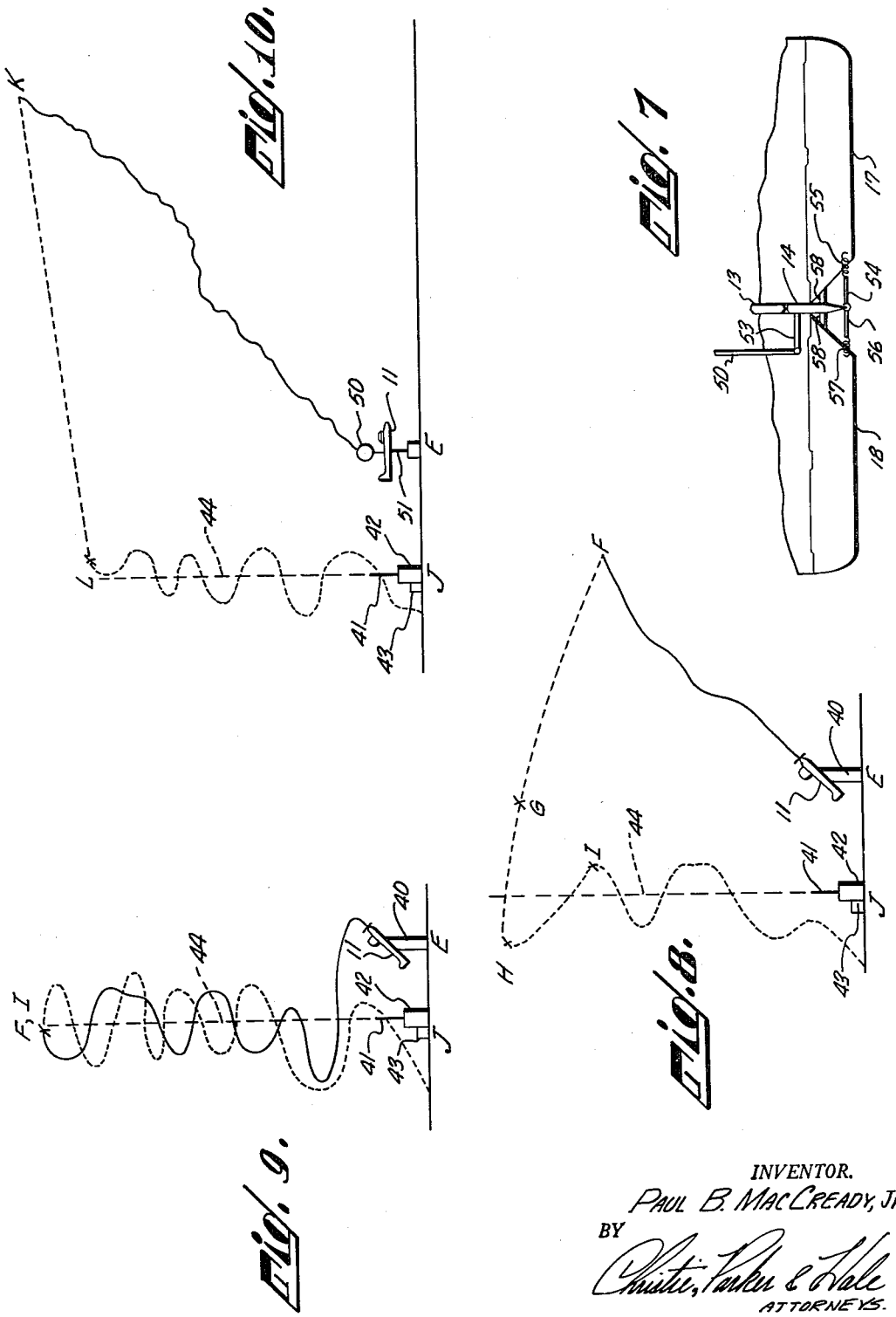

3,005,605
AUTOMATIC HOMING AIRCRAFT
Paul B. MacCready, Jr., 1065 Armada Drive,
Pasadena, Calif.
Filed Jan. 19, 1959, Ser. No. 787,415
2 Claims. (Cl. 244—77)

This invention relates to the use of small unmanned aerodynamic vehicles to transport various devices to a homing station. Scientific information in the form of measurements or samples are collected by appropriate instruments and devices carried by the vehicle, and these instruments and devices are returned to a base station for processing of the information and reuse of the instruments. In addition, the vehicle may be used as a small cargo transport.

The use of radiosonde systems for atmospheric probing is well known. In such a system, instruments are sent aloft by means of balloons, and the instruments are later parachuted to earth. Recovery of the instruments, which are quite valuable, is dependent upon the location at which the instruments reach the earth. In many cases, the instruments descend at remote locations and are lost. Therefore, various devices for transmitting the required information to the base station during flight have been used. Such devices add to the expense of the device and add additional weight which must be lifted during flight. Some positive method for insuring the return of such instruments to the ground station is desirable in order to eliminate the necessity for transmitting information during flight, and thereby reducing the weight required to be lifted.

According to the present invention, a small aerodynamic vehicle, bearing scientific instruments, is equipped with a homing device so as to insure the return of the vehicle and instruments to the base station. Various types of vehicles may be used for such a scientific probe, depending upon the particular application of the invention. For example, one embodiment of the invention utilizes a glider or a rotary wing vehicle to return high altitude research instruments to the base station. A second embodiment utilizes a self-powered aircraft, either a conventionally configured airplane or a helicopter, to make a powered ascent.

The homing device is preferably a ground base transmitter and an airborne receiver. The receiver output circuit is connected to the control surfaces of the vehicle so as to adjust these surfaces in response to the deviation of the vehicle heading from the transmitter location. In the most elementary embodiment of the homing device, the vehicle has a directional antenna system to which the receiver is connected so as to give an output related to the deviation of the craft heading from the homing transmitter. This output is then applied as a corrective control to the vehicle control surfaces so as to cause the vehicle to head toward the transmitter. In such a system, the portion of the homing device located aboard the vehicle is passive, thereby reducing the weight which must be carried aloft. More complex systems of homing may also be utilized. For example, the vehicle may transmit a signal to indicate its bearing from the ground station. Optionally, information gathered by the probe may be relayed to the base station during flight.

The invention has wide application in the field of scientific research. Such a vehicle can be used to gather temperature and humidity information. Air sampling and recording of cosmic ray and natural nuclei bombardment may be accomplished. Such a vehicle can also be utilized as a surveillance device, a transportation device, or an electromagnetic radiation detection device. Small explosive loads can be delivered at targets transmitting signals suitable for homing. Thus, this invention is applicable to any process in which a relatively light load is to be transported to a station from which signals suitable for homing emanate.

The invention may be more readily understood by referring to the accompanying drawing, in which:

FIG. 1 is a right side elevation of a vehicle, which may be either powered or unpowered, constructed according to the invention;

FIG. 2 is a top plan view of the vehicle of FIG. 1;

FIG. 3 is a front elevation of the vehicle of FIG. 1;

FIG. 4 is a left side elevation of a nose section and a propulsion unit taken in the area of 4—4 of FIG. 1;

FIG. 5 is a right side elevation taken in the area 4—4 of a nose section suitable for installation on the vehicle of FIG. 1 when the vehicle is to be used as a glider;

FIG. 7 is a plan view of the control surfaces and connections used to control the flight of the vehicle of FIG. 1;

FIG. 8 is a diagram showing the flight path of a powered vehicle such as the vehicle shown in FIG. 1 in which the vehicle homes during descent and during the final portion of ascent;

FIG. 9 is a diagram showing the flight path of a powered vehicle such as the vehicle of FIG. 1, in which the vehicle homes during both ascent and descent; and FIG. 10 is a diagram of the flight path of a non-powered vehicle such as the vehicle shown in FIG. 1 in which the vehicle is lifted by a balloon and homes during descent.

Figure 6:
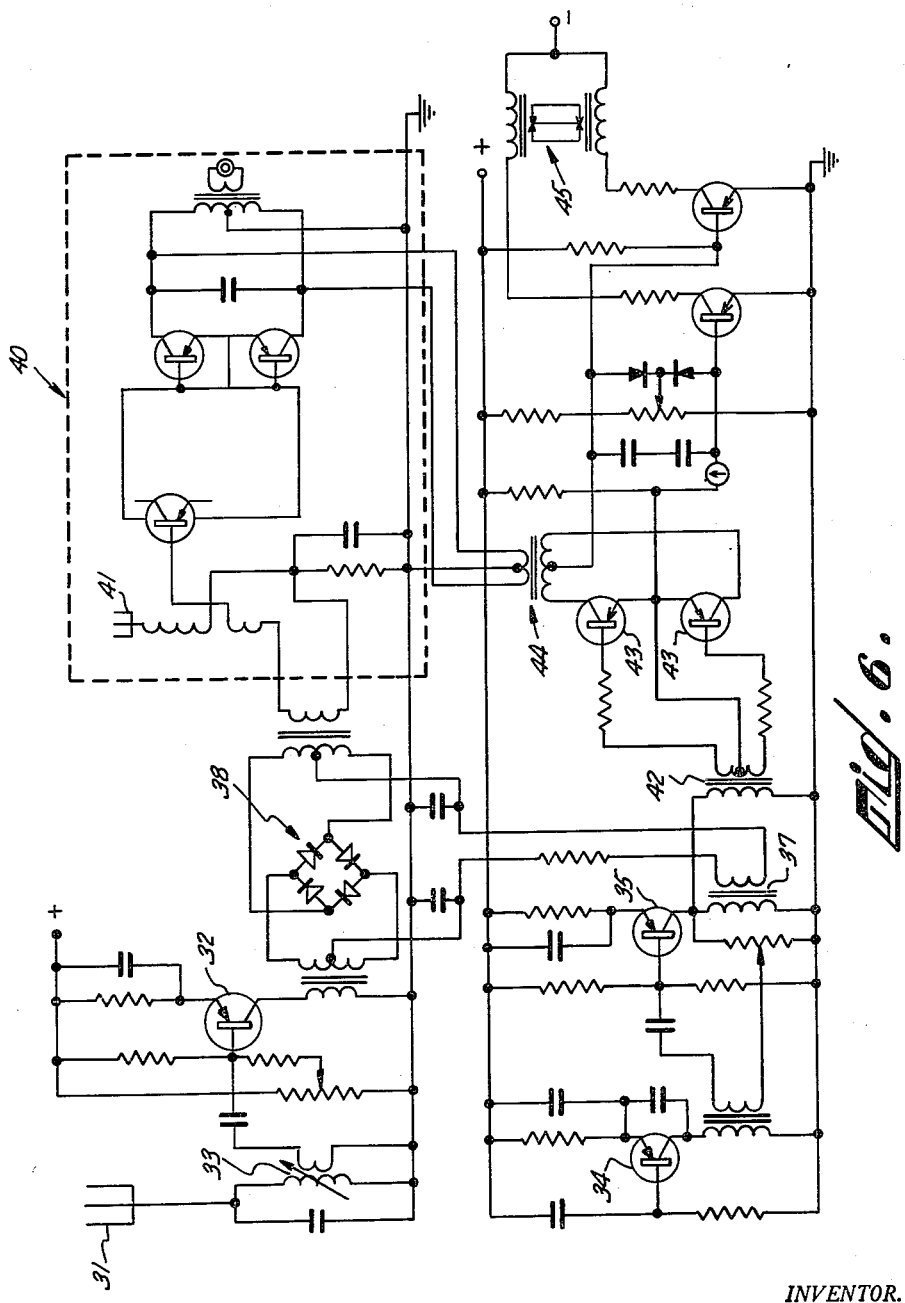
FIG. 6 is a schematic wiring diagram of a homing receiver suitable for use to direct the flight of the vehicle of FIG. 1.

In FIGURE 1 a small aerodynamic vehicle 11 of conventional aircraft configuration is shown. The aircraft 11 has a polyhedral wing 12, a vertical stabilizer surface 13 including a rudder 14, a horizontal stabilizer surface 15, and landing gear 16. A nose section may be attached to the aircraft 11 along the separation line 11A of FIG. 1. The space indicated generally by the dotted lines enclosing the letter A is available as a cargo carrying space. The space indicated generally by the dotted lines enclosing the letter B contains the radio homing receiver shown in FIG. 6, which is to be subsequently described. The nose section to be atached along separation line 11A may contain either a propulsion unit for powered flight (FIG. 4) or a ballast or additional cargo carrying unit for unpowered flight (FIG. 5). When employed in its powered version, the vehicle 11 weighs 4.9 pounds. When employed in its unpowered version, the vehicle 11 weighs 3.5 pounds.

FIGURE 2 shows a top plan view of the vehicle of FIG. 1. The horizontal stabilizer surfaces 15 include a conrtollable right elevator 17 and a controllable left elevator 18. The method of controlling these elevator surfaces 17 and 18 in conjunction with the rudder surface 14 is shown in FIGURE 7 and its operation will be described therewith. The wing 12 has a span of 7.0 feet and an area of 7 square feet. The air foil section used is preferably NACA 6412.

FIGURE 3 shows a front elevation of the aircraft of FIG. 1, and illustrates particularly the polyhedral wing 12. The wing 12 consists of two first sections 20 and two second sections 21. Each first section 20 is 24 inches in length. Each second section 21 is 18 inches in length. The dihedral angle $\alpha$ of the first sections 20 is 8½ degrees, and the dihedral angle $\beta$ of the second sections 21 is 24 degrees.

FIGURE 4 shows a detachable nose section 25 containing a propulsion unit 26. The detachable nose section 25 has an attaching section 27 which is attached to the vehicle of FIG. 1 along separation line 11A. The fuel supply for the propulsion unit 26 is located in the vehicle 11 (see FIG. 1) immediately below the attaching section 27 (FIG. 4). The propulsion unit 26 preferably consists of a Fox "59" engine and is mounted so as to have a right thrust of 3 degrees and a down thrust of 2 degrees. A propeller 28 is attached to the engine 26 by conventional means.

FIGURE 5 shows a detachable nose section 30 which may be attached to the vehicle 11 (FIG. 1) along the separation line 11A when the vehicle is to be used in an unpowered or glider application. For such an application, additional ballast weight is necessary in the nose section 30 for stability and such ballast weight preferably consists of additional instrumentation.

FIG. 6 is a schematic drawing of a radio homing receiver which may be operated in the glider. A sense antenna 31 having an omnidirectional response characteristic is connected to a radio frequency amplifying transistor 32 through a tunable inductance 33. The transistor 32 may for example be type 2N247. A second transistor 34, preferably of type 2N109, is connected in a modified Colpitts oscillator circuit having an output frequency of approximately 1,000 cycles per second.

The output of the oscillator is applied to an amplifying transistor 35 of the same type. An output transformer 37 couples the output from the amplifying transistor 35 to a conventional diode ring modulator 38. The amplified radio frequency from the radio frequency transistor 32 is also connected to the diode ring modulator 38. The output of the diode ring modulator 38 consists of a radio frequency signal whose phase is reversed at the frequency of the audio oscillator. The diode ring modulator 38 output is applied to a conventional transistorized superheterodyne receiver, Emerson Model 888 for example, indicated within the dotted line 40 and having a loop antenna 41.

The loop antenna 41 is oriented to give the familiar "figure-eight" response perpendicular to the fore and aft axes of the vehicle. The output of the diode ring modulator 38 is alternately added to and subtracted from the input of the receiver 40 at the audio oscillator frequency. Therefore, the output of the receiver 40 consists of a square wave having the frequency of the audio oscillator and an amplitude proportional to the difference in the amplitude of the signal resulting when the diode ring modulator 38 output is added to the input of the receiver 40 and when the diode ring modulator 38 output is subtracted from the receiver 40.

The output of the audio oscillator is also applied through an input transformer 42 to a pair of push-pull connected transistors 43. This audio input frequency serves to switch the transistors on alternately at the frequency of the audio oscillator. The output of the receiver 40 is applied to the primary of a transformer 44, a secondary of which is switched by the transistors 43 at the audio oscillator frequency. The tunable inductance 33 is adjusted so that the output of the transformer 44 is a uniphase potential. The polarity of this output then indicates the relationship of the glider heading to the homing transmitter and the amplitude of the potential indicates the amount of deviation of the heading from the homing transmitter. This potential is amplified and applied to a three-position polarity sensitive relay 45. The relay controls the horizontal and vertical control surfaces of the vehicle (FIG. 7).

FIGURE 7 shows the control surface connections for the glider. A control shaft 50 is connected at one end to the polarity sensitive relay 45 (see FIG. 6). The control shaft 50 is connected at its other end to a pivot 51 connected to the rudder 14. The rudder 14 has a pivot arm 53 to which are connected the right elevator control shaft 54, which includes a spring 55, and the left elevator control shaft 56, which includes a spring 57. The spring 55 connects the right elevator control shaft 54 to the right elevator 17. The spring 57 connects the left elevator control shaft 56 to the left elevator 18. A pair of elevator stops 58 limit the downward movement of the right elevator 17 and left elevator 18.

When the shaft 50 is moved toward the nose of the vehicle, rudder 14 is moved to the left by the movement of the rudder pivot arm 53. The movement of the rudder 14 to the left causes the right elevator control shaft 54 and spring 55 to pull the right elevator 17 upward. Downward movement of the left elevator 18 is prevented by the elevator stops 58. When the rod 50 is moved toward the rear of the vehicle by the action of the polarity sensitive relay 45, rudder 14 is moved to the right by the action of the shaft 50 and the pivot arm 51. The movement of the rudder 14 to the right causes the left elevator control shaft 56 and spring 57 to pull the left elevator 18 upward. Downward movement of the right elevator 17 is prevented by the elevator stops 58. The use of the rudder and elevator simultaneously enables the vehicle 11 to make banking turns. The receiver circuit gives a receiver output potential of a given polarity indicating a heading deviation in a certain direction. This potential energizes the relay 45 to cause the appropriate movement of control surfaces as above described. The heading deviation of the vehicle from the homing signal transmitter is thereby corrected.

FIGURE 8 shows the flight path of a powered vehicle such as the vehicle shown in FIG. 1 operated in one embodiment of the invention. The vehicle 11 is mounted on a launcher 40 which may be of any conventional design. A homing transmitter antenna 41 is mounted on an antenna mast 42 and is connected to a homing transmitter 43. The homing transmitter antenna 41 is preferably constructed so as to give a radiation pattern of a conventional vertical di-pole. The launcher 40 is located at point E. The vehicle 11, when launched in free flight, flies in either a predetermined or randomly ascending path to point F.

When the vehicle 11 reaches point F, the transmitter 43 is energized, preferably by ground station personnel, and homing signals are transmitted from the antenna 41. These homing signals cause the vehicle 11 to home on the transmitter antenna 41 and the vehicle 11 thereby flies to point G. At point G the vehicle 11 enters an area known as the cone of silence in which, due to the characteristic radiation pattern of the antenna 41, only nominal homing control is available.

The vehicle 11 continues in its flight to point H, at which point the vehicle 11 re-enters the area of radiation in which positive homing is available. The heading of the vehicle 11 is thereupon reversed and the vehicle 11 proceeds again into the area of only nominal homing control until reaching point I. At point I, the vehicle again emerges into the area of positive homing control and the heading of the vehicle 11 is thereby reversed. This process continues until the propulsion unit 26 ceases to propel the vehicle 11, at which time the vehicle commences its descent to the ground reaching point J adjacent the homing transmitter antenna 41. Thus, from point F to point J, the vehicle 11 homes about an axis 44 perpendicular to the ground extending upward from the antenna 41.

The horizontal distance of the point F from the transmitter antenna 41 may be appreciable, in which case it may be desired to record only the atmospheric conditions directly over the homing antenna 41. In this case, the recording would take place during the unpowered flight path I—J. In the event that the recording is desired at an approximately constant altitude, the recording may be selected to take place along the flight path F—G.

FIGURE 9 shows an embodiment of the invention in which homing is used both during ascent and descent. The transmitter 43 is energized prior to launching the vehicle 11 so that upon launching homing signals are being transmitted from the antenna 41. The vehicle 11 is launched from the launcher 40 located at point E and rises in ascending flight randomly homing about the perpendicular axis 44 in the cone of silence of the antenna 41 until point F is reached. At point F, the propulsion of the vehicle 11 ceases so that the vehicle is now in a location comparable to that of point I of FIG. 8. The vehicle then proceeds to randomly home about the perpendicular axis 44, landing at point J adjacent the antenna 41.

FIGURE 10 shows an embodiment of the invention in which a balloon 50 is used to lift an unpowered vehicle 11′. The balloon 50 and vehicle 11′ are restrained by a launching device 51 of conventional design located at point E. The balloon 50 and vehicle 11′ are then released from the launching device 51 and the vehicle 11′ is carried aloft by the balloon 50 to point K. Point K may be, for example, 20 miles above the surface of the earth.

If desired, information is recorded during the ascent of the vehicle. Upon reaching point K, the vehicle 11′ is released by conventional means. For example, a barometric pressure release device may be utilized. The transmitter 43 is energized, and homing signals transmitted by the transmitter 43 are received by the vehicle 11′. The homing device causes the vehicle 11′ to assume a heading directed toward the perpendicular axis 44. The vehicle 11′ flies in an approximately straight line from point K to point L, at which point the vehicle 11′ enters the cone of silence of the antenna 41. The vehicle 11′ then proceeds to randomly home in descending flight about the perpendicular axis 44, landing on the ground at point J adjacent the antenna 41.

I claim:

1. A homing transport system comprising a small unmanned aerodynamic vehicle capable of sustained free flight, means for initiating the free flight of the vehicle, a radio transmitter located at a ground station, radio signal reception means attached to the vehicle and including a first antenna constructed and positioned so as to give an omnidirectional horizontal response characteristic and a second antenna constructed and positioned so as to give a "figure-eight" response characteristic with respect to the heading of the vehicle, said radio signal reception means being operable in response to the receipt of a radio signal by said antennas from said transmitter to produce an output which is a function of the direction of the vehicle heading from a vertical axis extending upwardly from the ground transmitter location, vehicle direction of flight control means operable in response to the output of the reception means to cause the vehicle to home with respect to the vertical axis, and information collecting means borne by the vehicle.

2. A system as described in claim 1 in which the vehicle is self-powered and homes about the perpendicular axis during the ascending portion of flight.

References Cited in the file of this patent

UNITED STATES PATENTS

| | | |
|---|---|---|
| 1,387,850 | Hammond | Aug. 16, 1921 |
| 2,288,102 | Meredith | June 30, 1942 |
| 2,612,331 | Frazier et al. | Sept. 30, 1952 |

OTHER REFERENCES

Time Magazine Article, N.Y., July 25, 1955, vol. LXVI, No. 4, page 62.

Scientific American, N.Y., February 8, 1919, vol. CXX, No. 6, page 1.